United States Patent
Tamura et al.

(10) Patent No.: US 9,290,615 B2
(45) Date of Patent: Mar. 22, 2016

(54) TONER POLYESTER RESIN, METHOD FOR PRODUCING SAME, AND TONER

(71) Applicant: Mitsubishi Rayon Co., Ltd., Chiyoda-ku (JP)

(72) Inventors: Yoko Tamura, Toyohashi (JP); Masaru Sugiura, Toyohashi (JP)

(73) Assignee: Mitsubishi Rayon Co., Ltd., Chiyoda-ku (JP)

( * ) Notice: Subject to any disclaimer, the term of this patent is extended or adjusted under 35 U.S.C. 154(b) by 0 days.

(21) Appl. No.: 14/405,936

(22) PCT Filed: Jun. 11, 2013

(86) PCT No.: PCT/JP2013/066061
§ 371 (c)(1),
(2) Date: Dec. 5, 2014

(87) PCT Pub. No.: WO2013/187401
PCT Pub. Date: Dec. 19, 2013

(65) Prior Publication Data
US 2015/0152219 A1    Jun. 4, 2015

(30) Foreign Application Priority Data
Jun. 13, 2012    (JP) .................................. 2012-133744

(51) Int. Cl.
| | |
|---|---|
| C08G 63/12 | (2006.01) |
| C08G 63/672 | (2006.01) |
| C08G 63/78 | (2006.01) |
| G03G 9/08 | (2006.01) |
| G03G 9/087 | (2006.01) |
| C08G 63/66 | (2006.01) |
| C08G 63/42 | (2006.01) |

(52) U.S. Cl.
CPC .............. *C08G 63/672* (2013.01); *C08G 63/66* (2013.01); *C08G 63/78* (2013.01); *G03G 9/081* (2013.01); *G03G 9/0806* (2013.01); *G03G 9/087* (2013.01); *G03G 9/08755* (2013.01); *G03G 9/08795* (2013.01); *G03G 9/08797* (2013.01)

(58) Field of Classification Search
CPC ..... C08G 9/087; C08G 63/127; C08G 63/685
USPC .......... 430/109.4, 137.14; 528/271, 272, 292, 528/296, 298, 308.6
See application file for complete search history.

(56) References Cited

U.S. PATENT DOCUMENTS

| | | | |
|---|---|---|---|
| 6,455,135 B1 | 9/2002 | Kamiyama et al. | |
| 2003/0232959 A1 | 12/2003 | Adelman et al. | |
| 2004/0092703 A1 | 5/2004 | Germroth et al. | |
| 2010/0316944 A1 | 12/2010 | Nakajima et al. | |
| 2011/0212396 A1 | 9/2011 | Farrugia et al. | |
| 2012/0156607 A1 | 6/2012 | Farrugia et al. | |
| 2012/0264047 A1* | 10/2012 | Farrugia et al. ............ 430/109.4 |
| 2012/0276479 A1 | 11/2012 | Yoo et al. | |
| 2013/0171555 A1 | 7/2013 | Kubo et al. | |

FOREIGN PATENT DOCUMENTS

| | | |
|---|---|---|
| JP | 11-174711 A | 7/1999 |
| JP | 11-241004 A | 9/1999 |
| JP | 2004-197051 A | 7/2004 |
| JP | 2005-300996 A | 10/2005 |
| JP | 2005-530000 A | 10/2005 |
| JP | 2006-506485 A | 2/2006 |
| JP | 2008-537786 A | 9/2008 |
| JP | 2010-090315 A | 4/2010 |
| JP | 2010-95696 A | 4/2010 |
| JP | 2010-215770 A | 9/2010 |
| JP | 2010-285555 A | 12/2010 |
| JP | 2010-286610 A | 12/2010 |
| JP | 2011-180591 A | 9/2011 |
| JP | 2011-232665 A | 11/2011 |
| JP | 2012-073304 A | 4/2012 |
| JP | 2012-133356 A | 7/2012 |
| JP | 2012-145600 A | 8/2012 |
| JP | 2012-521468 A | 9/2012 |
| JP | 2012-214680 A | 11/2012 |
| JP | 2013-231148 A | 11/2013 |
| KR | 10-2012-0056561 | 6/2012 |
| WO | WO 03/106531 A1 | 12/2003 |
| WO | WO 2006/102280 A1 | 9/2006 |
| WO | WO 2010/108964 A1 | 9/2010 |
| WO | WO 2012/043531 A1 | 4/2012 |

OTHER PUBLICATIONS

International Search Report issued Jul. 16, 2013 in PCT/JP2013/066051 Filed Jun. 11, 2013.
U.S. Appl. No. 14/646,071, filed May 20, 2015, Tamura, et al.
International Search Report issued Jan. 7, 2014 in PCT/JP2013/082832 (with English language translation).
Office Action mailed Dec. 9, 2015 in U.S. Appl. No. 14/646,071, filed May 20, 2015.

\* cited by examiner

*Primary Examiner* — Terressa Boykin
(74) *Attorney, Agent, or Firm* — Oblon, McClelland, Maier & Neustadt, L.L.P.

(57) ABSTRACT

This toner polyester resin contains 5-30 mass % of a constitutional unit derived from isosorbide, and has a storage elastic modulus (G') at 180° C. of 400-1,000 Pa. This method for producing the toner polyester resin involves polycondensing a mixture containing 5-30 mass % of isosorbide and a polycarboxylic acid at 230° C. or lower, and completing a polycondensation reaction at a softening temperature in the range of 135-150° C.

20 Claims, No Drawings

TONER POLYESTER RESIN, METHOD FOR PRODUCING SAME, AND TONER

TECHNICAL FIELD

The present invention relates to a polyester resin for toner used in, for example, an electrophotographic printing method, an electrostatic printing method, and the like and a method for producing the same, and a toner.

This application claims priority on Japanese Patent Application No. 2012-133744 filed on Jun. 13, 2012, the disclosure of which is incorporated by reference herein.

BACKGROUND ART

In methods for obtaining images by an electrophotographic printing method and an electrostatic printing method, electrostatic charge images formed on photosensitive materials are fixed after being developed with a toner which has been charged by friction.

Fixing systems include heat roller systems which fix developed toner images using pressurized heated rollers, and non-contact fixing systems in which fixing is accomplished using electric ovens or flash beam light.

For these processes to be performed smoothly, the toner must be able to hold a stable electrostatic charge, and must satisfactorily fix onto a paper.

In recent years, with the advancement of speeding-up, miniaturization, energy saving, and the like of printers, the toner is required to improve toner characteristics such as storage stability, low temperature-fixing property, and hot offset resistance.

A binder resin for toner exerts a significant influence on the above-mentioned toner characteristics. Heretofore, there have been used, as the binder resin, a polyester resin which is excellent in toughness and fixing property at low temperature, and has satisfactory performance balancing.

Meanwhile, from the viewpoint of a reduction in environmental burdens, such as control of global warming, an attempt has been made to replace a conventional plastic derived from a petroleum material by a plastic derived from biomass.

Use of a biomass material is required for the toner, and also use of a biomass material is required for the binder resin composing the toner.

Patent Document 1 discloses, as a polyester resin using a biomass material, for example, a polyester resin for toner in which isosorbide derived from a plant material is used as a polyhydric alcohol.

Patent Document 1: Japanese Unexamined Patent Application, Publication No. 2010-285555

DISCLOSURE OF THE INVENTION

Problems to be Solved by the Invention

However, the toner containing the polyester resin for toner in Patent Document 1 was insufficient in balance among storage stability, fixing property, hot offset resistance, and image stability.

An object of the present invention is to provide a polyester resin for toner, capable of obtaining a toner which is excellent in storage stability, fixing property, hot offset resistance, and image stability when isosorbide is used; a method for producing the same; and a toner.

Means for Solving the Problems

The present invention has the following characteristic features.

<1> A polyester resin for toner, including 5 to 30% by mass of a constitutional unit derived from isosorbide, wherein a storage elastic modulus G' at 180° C. is within a range of 400 to 1,000 Pa.

<2> The polyester resin for toner according to <1>, which includes a constitutional unit derived from a tri- or higher polyhydric carboxylic acid.

<3> The polyester resin for toner according to <2>, which includes 5 to 25 parts by mol of the constitutional unit derived from a tri- or higher polyhydric carboxylic acid when the total content of the whole acid component in the polyester resin for toner is 100 parts by mol.

<4> The polyester resin for toner according to any one of <1> to <3>, which includes 30% by mass or more of a constitutional unit derived from biomass.

<5> The polyester resin for toner according to any one of <1> to <4>, which includes 9 to 25% by mass of the constitutional unit derived from isosorbide.

<6> The polyester resin for toner according to any one of <1> to <5>, which includes a constitutional unit derived from 1,3-propanediol.

<7> The polyester resin for toner according to <6>, wherein the 1,3-propanediol is derived from biomass.

<8> A method for producing a polyester resin for toner, which includes polycondensing a mixture containing 5 to 30% by mass of isosorbide and a polyhydric carboxylic acid at 230° C. or lower, and completing a polycondensation reaction at a softening temperature within a range of 135 to 150° C.

<9> The method for producing a polyester resin for toner according to <8>, wherein the polyhydric carboxylic acid includes a tri- or higher polyhydric carboxylic acid.

<10> The method for producing a polyester resin for toner according to <9>, which includes 5 to 25 parts by mol of the tri- or higher polyhydric carboxylic acid when the total content of the whole acid component in the mixture is 100 parts by mol.

<11> The method for producing a polyester resin for toner according to any one of <8> to <10>, wherein the mixture contains 30% by mass or more of a raw material derived from biomass.

<12> The method for producing a polyester resin for toner according to any one of <8> to <11>, which contains 9 to 25% by mass of the isosorbide in the mixture.

<13> The method for producing a polyester resin for toner according to any one of <8> to <12>, wherein the mixture contains 1,3-propanediol.

<14> The method for producing a polyester resin for toner according to any one of <8> to <13>, wherein the mixture is polycondensed at 215° C. or higher.

<15> A toner including the polyester resin for toner according to any one of <1> to <7>.

Effects of the Invention

According to the polyester resin for toner of the present invention, it is possible to obtain a toner which is excellent in storage stability, fixing property, hot offset resistance, and image stability when isosorbide is used.

According to the method for producing a polyester resin for toner of the present invention, it is possible to produce a polyester resin for toner, capable of obtaining a toner which is excellent in storage stability, fixing property, hot offset resistance, and image stability when isosorbide is used.

The toner of the present invention is excellent in storage stability, fixing property, hot offset resistance, and image stability when isosorbide is used.

PREFERRED MODE FOR CARRYING OUT THE INVENTION

<Polyester Resin for Toner>

The polyester resin for toner of the present invention includes 5 to 30% by mass of a constitutional unit derived from isosorbide. When the content of the constitutional unit derived from isosorbide is 5% by mass or more in 100% by mass of all units composing polyester resin for toner, the obtained toner exhibits satisfactory storage stability. Meanwhile, when the content is 30% by mass or less, the obtained toner exhibits satisfactory image stability.

The content of the constitutional unit derived from isosorbide is preferably 9% by mass or more from the viewpoint of the fact that the storage stability is more improved, and preferably 25% by mass or less from the viewpoint of the fact that the image stability is more improved.

The polyester resin including a constitutional unit derived from isosorbide is obtained by polycondensing a mixture (A) containing a polyhydric alcohol and a polyhydric carboxylic acid using a known method, although the details will be mentioned below. In order that the polyester resin for toner includes 5 to 30% by mass of a constitutional unit derived from isosorbide, the content of isosorbide in 100% by mass of the mixture (A) may be controlled within a range of 5 to 30% by mass.

Isosorbide is preferably derived from biomass.

Because of including a cyclic structure, isosorbide enables prevention of a decrease in glass transition temperature (Tg) when the content of a raw material derived from biomass in the mixture (A) is increased, thus effectively preventing deterioration of the storage stability.

It is possible to use, as the isosorbide derived from biomass, commercially available products. Examples thereof include Polysorb-P and Polysorb-PB manufactured by Roquette, Inc.; and Technical Grade and Polymer Grade manufactured by ADM Company.

The polyester resin for toner preferably includes a constitutional unit derived from a tri- or higher polyhydric carboxylic acid. When the constitutional unit derived from a tri- or higher polyhydric carboxylic acid is included, a resin having high elastic modulus at high temperature is obtained, and thus the toner exhibits more satisfactory hot offset resistance.

The content of the constitutional unit derived from a tri- or higher polyhydric carboxylic acid is preferably within a range of 5 to 25 parts by mol when the total content of the whole acid component in the polyester resin for toner is 100 parts by mol. When the content of the constitutional unit derived from a tri- or higher polyhydric carboxylic acid is 5 parts by mol or more, it becomes easy to obtain a resin having high elastic modulus at high temperature, and thus the toner may exhibit more satisfactory hot offset resistance. Meanwhile, when the content of the constitutional unit derived from a tri- or higher polyhydric carboxylic acid is 25 parts by mol or less, storage stability of the toner is more improved, and thus it may become easy to control the gelation reaction upon the polycondensation reaction.

In order that the polyester resin for toner includes the constitutional unit derived from a tri- or higher polyhydric carboxylic acid, the tri- or higher polyhydric carboxylic acid may be blended in the mixture (A).

Examples of the tri- or higher polyhydric carboxylic acid include trimellitic acid, pyromellitic acid, 1,2,4-cyclohexanetricarboxylic acid, 2,5,7-naphthalenetricarboxylic acid, 1,2,4-naphthalenetricarboxylic acid, 1,2,5-hexanetricarboxylic acid, 1,2,7,8-octanetetracarboxylic acid, or esters or acid anhydrides thereof. Of these, trimellitic acid or an anhydride thereof is preferable from the viewpoint of the fact that it is industrially readily available. These tri- or higher polyhydric carboxylic acids may be used alone, or two or more thereof may be used in combination.

The polyester resin for toner preferably includes 30% by mass or more of a constitutional unit derived from biomass. Inclusion of 30% by mass or more of the constitutional unit derived from biomass in 100% by mass of all units composing the polyester resin for toner enables reduction in environmental burdens.

From the viewpoint that environmental burdens are more reduced, the polyester resin for toner preferably includes 35% by mass or more of the constitutional unit derived from biomass.

Meanwhile, in Japan BioPlastics Association, products, in which the content of a component derived from biomass in a raw material or a plastic product is 25% by mass or more relative to the whole amount, are certified as "Biomass Pla" and are authorized to use the certification logo.

In order to control the content of the component derived from biomass in the toner relative to the whole amount within a range of 25% by mass or more, the polyester resin for toner preferably includes 30% by mass or more of a constitutional unit derived from biomass.

A biomass ratio in the raw material or plastic product can be measured by ASTM D6866 "Standard for Determining Biogenic Carbon Content Employing Radiocarbon (C14) Measurement Method".

In order that the polyester resin for toner includes 30% by mass or more of a constitutional unit derived from biomass, the content of the raw material derived from biomass in 100% by mass of the mixture (A) may be controlled to 30% by mass or more.

Examples of the raw material derived from biomass include isosorbide derived from a plant material, 1,3-propanediol derived from a plant material, and the like.

The polyester resin for toner preferably includes a constitutional unit derived from 1,3-propanediol. Inclusion of the constitutional unit derived from 1,3-propanediol enables control of Tg of the polyester resin for toner with ease.

The content of the constitutional unit derived from 1,3-propanediol is preferably within a range of 5 to 25% by mass in 100% by mass of all units composing the polyester resin for toner. When the content of the constitutional unit derived from 1,3-propanediol is within the above range, the obtained toner may exhibit more satisfactory storage stability. Particularly, when 1,3-propanediol is derived from biomass, the content of the constitutional unit derived from 1,3-propanediol of 5% by mass or more enables increase in the content of the constitutional unit derived from biomass in the polyester resin for toner.

In order that the polyester resin for toner includes a constitutional unit derived from 1,3-propanediol, 1,3-propanediol may be blended in the mixture (A).

It is preferred that 1,3-propanediol is derived from biomass.

It is possible to obtain 1,3-propanediol derived from biomass by using cornstarch or the like as a raw material. It is possible to use, as 1,3-propanediol derived from biomass, commercially available products, and examples thereof include Susterra (registered trademark) propanediol manufactured by DuPont Company.

The polyester resin for toner may include a constitutional unit other than the above-mentioned constitutional unit derived from biomass, constitutional unit derived from isosorbide, constitutional unit derived from a tri- or higher polyhydric carboxylic acid, and constitutional unit derived from 1,3-propanediol (hereinafter also referred to as an "optional constitutional unit").

Examples of the optional constitutional unit include a constitutional unit derived from polyhydric alcohol other than isosorbide and 1,3-propanediol, a constitutional unit derived from dihydric carboxylic acid, and the like.

In order that the polyester resin for toner includes the optional constitutional unit, polyhydric alcohol other than isosorbide and 1,3-propanediol (other polyhydric alcohol), and dihydric carboxylic acid may be blended in the mixture (A).

Examples of the other polyhydric alcohol include aliphatic diols such as ethylene glycol, neopentyl glycol, polyethylene glycol, 1,2-propanediol, 1,3-butanediol, 1,4-butanediol, diethylene glycol, triethylene glycol, and 1,4-cyclohexanedimethanol; and aromatic diols such as polyoxypropylene-(2.3)-2,2-bis(4-hydroxyphenyl)propane, polyoxyethylene-(2.0)-2,2-bis(4-hydroxyphenyl)propane, polyoxypropylene-(2.0)-2,2-bis(4-hydroxyphenyl)propane, polyoxypropylene-(2.2)-polyoxyethylene-(2.0)-2,2-bis(4-hydroxyphenyl)propane, polyoxypropylene(6)-2,2-bis(4-hydroxyphenyl)propane, polyoxypropylene-(2.2)-2,2-bis(4-hydroxyphenyl)propane, polyoxypropylene-(2.4)-2,2-bis(4-hydroxyphenyl)propane, and polyoxypropylene-(3.3)-2,2-bis(4-hydroxyphenyl)propane. These other polyhydric alcohols may be used alone, or two or more thereof may be used in combination.

Examples of the dihydric carboxylic acid include aromatic dicarboxylic acids such as terephthalic acid, isophthalic acid, dimethyl terephthalate, dimethyl isophthalate, diethyl terephthalate, diethyl isophthalate, dibutyl terephthalate, and dibutyl isophthalate, or esters or acid anhydrides thereof; and aliphatic dicarboxylic acids such as phthalic acid, sebacic acid, isodecylsuccinic acid, dodecenylsuccinic acid, maleic acid, fumaric acid, adipic acid, and succinic acid, or esters or acid anhydrides thereof. Of these, aromatic dicarboxylic acids, or esters or acid anhydrides thereof are preferable from the viewpoint of the fact that thermal characteristics, strength, and image stability of the obtained resin are improved. Terephthalic acid and isophthalic acid are particularly preferable in view of the fact that they are excellent in handling and cost. These other polyhydric alcohols may be used alone, or two or more thereof may be used in combination.

The content of the constitutional unit derived from an aromatic dicarboxylic acid is preferably within a range of 75 to 95 parts by mol when the total content of the whole acid component in the polyester resin for toner is 100 parts by mol. When the content of the constitutional unit derived from an aromatic dicarboxylic acid is 75 parts by mol or more, the obtained toner exhibits more satisfactory storage stability. Meanwhile, when the content is 95 parts by mol or less, the obtained toner exhibits more satisfactory hot offset resistance.

The content of the constitutional unit derived from an aliphatic dicarboxylic acid is preferably within a range of 15 parts by mol or less when the total content of the whole acid component in the polyester resin for toner is 100 parts by mol. When the content of the constitutional unit derived from an aliphatic dicarboxylic acid is 15 parts by mol or less, the resin strength may be enhanced, leading to satisfactory durability, or the stability of a charged state may be improved, leading to more satisfactory image stability.

(Physical Properties of Polyester Resin for Toner)

The storage elastic modulus G' at 180° C. of the polyester resin for toner of the present invention is within a range of 400 to 1,000 Pa. When the storage elastic modulus G' at 180° C. is 400 Pa or more, the obtained toner exhibits satisfactory hot offset resistance. Meanwhile, the storage elastic modulus is 1,000 Pa or less, the obtained toner exhibits satisfactory low temperature-fixing property.

From the viewpoint that the low temperature-fixing property is improved, the storage elastic modulus G' at 120° C. is preferably 20,000 Pa or less.

In order to control the storage elastic modulus G' at 180° C. within a range of 400 to 1,000 Pa, the mixture (A) may be polycondensed by a known method, followed by completion of the polycondensation reaction at a softening temperature within a range of 135 to 150° C., although the details will be mentioned below.

Each storage elastic modulus G' at 120° C. and 180° C. is storage elastic modulus G' at 120° C. and 180° C. obtained when measured within a range from 100° C. to 200° C. using 25 mmφ parallel plates under the conditions of a thickness of 1 mm, a frequency of 1 Hz, a strain of 1%, and a temperature raising rate of 3° C./minute. The storage elastic modulus G' can be measured, for example, using AR-2000ex manufactured by TA Instruments.

Tg of the polyester resin for toner is preferably within a range of 50 to 65° C. When Tg is 50° C. or higher, the obtained toner may exhibit more satisfactory storage stability. Meanwhile, when Tg is 65° C. or lower, the obtained toner may exhibit more satisfactory fixing property.

Tg of the polyester resin for toner is determined by the measurement using a differential scanning calorimeter. Specifically, melt quenching is performed by heating at 100° C. for 10 minutes and the measurement is performed at a temperature raising rate of 5° C./minute. Then, the temperature at the intersection between the chart baseline at the low temperature side and the tangent to the endothermic curve near Tg is determined and regarded as Tg.

The polyester resin for toner preferably has an acid value of 2 to 25 mgKOH/g. When the acid value is 2 mgKOH/g or more, the reactivity of the polyester resin for toner may be improved. Meanwhile, when the acid value is 25 mgKOH/g or less, the image density of the toner may be more stabilized.

The acid value of the polyester resin for toner is the value determined by dissolving the polyester resin for toner in benzyl alcohol, followed by titration with phenolphthalein as an indicator using a 0.02 N KOH benzyl alcohol solution.

A difference between the softening temperature (T4) and Tg (T4−Tg) of the polyester resin for toner is preferably 75° C. or higher. The difference between T4 and Tg of 75° C. or higher leads to more satisfactory hot offset resistance.

T4 of the polyester resin for toner is the temperature measured by a nozzle measuring 1 mmφ×10 mm under the constant rate heating conditions of a load of 294 N (30 Kgf) and a temperature raising rate of 3° C./minute, at which ½ of 1.0 g of a sample exhibited flow.

(Method for Producing Polyester Resin for Toner)

The polyester resin for toner is obtained, for example, by polycondensing a mixture (A) containing a polyhydric alcohol and a polyhydric carboxylic acid under the polymerization conditions mentioned below.

The mixture (A) contains 5 to 30% by mass of isosorbide, and a polyhydric carboxylic acid.

Isosorbide is preferably derived from biomass.

When the content of isosorbide in 100% by mass of the mixture (A) is 5% by mass or more, the obtained toner exhibits satisfactory storage stability. Meanwhile, when the content is 30% by mass or less, the obtained toner exhibits satisfactory image stability. The content of isosorbide in the mixture (A) is preferably 9% by mass or more from the viewpoint of the fact that the storage stability is more improved, and preferably 25% by mass or less from the viewpoint of the fact that the image stability is more improved.

The mixture (A) preferably contains, as the polyhydric carboxylic acid, a tri- or higher polyhydric carboxylic acid. When the mixture contains the tri- or higher polyhydric carboxylic acid, a resin having high elastic modulus at high temperature is obtained, and thus the obtained toner exhibits more satisfactory hot offset resistance.

Examples of the tri- or higher polyhydric carboxylic acid include those exemplified above. Trimellitic acid or an anhydride thereof is particularly preferable.

The content of the tri- or higher polyhydric carboxylic acid in the mixture (A) is preferably within a range of 5 to 25 parts by mol when the total content of the whole acid component in the mixture (A) is 100 parts by mol. When the content of the tri- or higher polyhydric carboxylic acid in the mixture (A) is within a range of 5 parts by mol or more, it becomes easy to obtain a resin having high elastic modulus at high temperature, and thus the obtained toner may exhibit more satisfactory hot offset resistance. Meanwhile, when the content of the tri- or higher polyhydric carboxylic acid is 25 parts by mol or less, the storage stability of toner may be more improved, thus making it easier to control the gelation reaction upon the polycondensation reaction.

The mixture (A) preferably contains 30% by mass or more of a raw material derived from biomass.

Examples of the raw material derived from biomass include isosorbide derived from a plant material, 1,3-propanediol derived from a plant material, and the like.

When the raw material derived from biomass in 100% by mass of the mixture (A) is 30% by mass or more, environmental burdens are reduced. The content of the raw material derived from biomass in the mixture (A) is preferably 35% by mass or more from the viewpoint of the fact that environmental burdens are more reduced.

The mixture (A) preferably contains 1,3-propanediol. Inclusion of 1,3-propanediol enables control of Tg of the polyester resin for toner with ease.

It is preferred that 1,3-propanediol is derived from biomass. It is possible to obtain 1,3-propanediol derived from biomass using cornstarch or the like as a raw material.

The content of 1,3-propanediol in the mixture (A) is preferably within a range of 5 to 25% by mass. When the content of 1,3-propanediol in 100% by mass of the mixture (A) is within the above range, the obtained toner exhibits more satisfactory storage stability.

Particularly, when 1,3-propanediol is derived from biomass, the content of 1,3-propanediol of 5% by mass or more enables an increase in the content of the raw material derived from biomass in the mixture (A), thus increasing the content of a constitutional unit derived from biomass in the polyester resin for toner.

The mixture (A) may contain a monomer other than the above-mentioned raw material derived from biomass, isosorbide, tri- or higher polyhydric carboxylic acid, and 1,3-propanediol (hereinafter also referred to as an "optional monomer").

Examples of the optional constitutional unit include a polyhydric alcohol other than isosorbide and 1,3-propanediol (other polyhydric alcohol), a dihydric carboxylic acid, and the like. Examples these other polyhydric alcohols and dihydric carboxylic acids include those exemplified above.

When using an aromatic dicarboxylic acid as the dihydric carboxylic acid, the content of the aromatic dicarboxylic acid in the mixture (A) is preferably within a range of 75 to 95 parts by mol when the total content of the whole acid component in the mixture (A) is 100 parts by mol. When the content of the aromatic dicarboxylic acid in the mixture (A) is 75 parts by mol or more, the toner exhibits more satisfactory storage stability. Meanwhile, when the content is 95 parts by mol or less, the obtained toner exhibits more satisfactory hot offset resistance.

When using an aliphatic dicarboxylic acid as the dihydric carboxylic acid, the content of the aliphatic dicarboxylic acid in the mixture (A) is preferably 15 parts by mol or less when the total content of the whole acid component in the mixture (A) is 100 parts by mol. When the content of the aliphatic dicarboxylic acid in the mixture (A) is 15 parts by mol or less, the resin strength may be enhanced, leading to satisfactory durability, or the stability of a charged state may be improved, leading to more satisfactory image stability.

Polymerization Conditions:

The polyester resin for toner is obtained by polycondensing a mixture (A) at 230° C. or lower, and completing the polycondensation reaction at a softening temperature within a range of 135 to 150° C.

The polycondensation reaction at 230° C. or lower enables control of the gelation reaction with ease to obtain a polyester resin for toner. The lower limit of the reaction temperature upon the polycondensation reaction is preferably 215° C. or higher, and more preferably 220° C. or higher, taking the reactivity into consideration.

When the polycondensation reaction is completed at a softening temperature of lower than 135° C., the storage elastic modulus G' at 180° C. of the obtained polyester resin for toner decreases. Meanwhile, when the polycondensation reaction is completed at a softening temperature of higher than 150° C., the storage elastic modulus G' at 180° C. of the obtained polyester resin for toner excessively increases.

Completion of the polycondensation reaction means as follows: after stopping of stirring, the pressure inside the reactor is returned to normal pressure and the pressure inside the reactor is increased by nitrogen, followed by removal of the reaction product from the lower portion of the reactor and further cooled to 100° C. or lower.

The method for deciding the softening temperature upon completion of the polymerization includes, for example, a method in which the polycondensation reaction is performed in advance in the desired composition of a polyester resin for toner and, after grasping a relation between the torque applied to a stirring blade and the softening temperature of the obtained resin, the polymerization is completed upon reaching the desired torque value.

The polycondensation may be performed by a known method. The polycondensation method includes, for example, a method in which a mixture (A) is charged in a reaction vessel and then polymerized through the esterification reaction or ester exchange reaction, and the polycondensation reaction.

In the case of the polycondensation, a polymerization catalyst and a release agent may be added to the mixture (A). When the release agent is added to the mixture (A), followed by the polycondensation, fixing property and wax dispersibility of the toner may be improved.

Examples of the polymerization catalyst include titanium tetraalkoxide such as tetrabutyl titanate; titanium oxide, dibutyltin oxide, tin acetate, zinc acetate, tin disulfide, antimony trioxide, germanium dioxide, magnesium acetate, and the like.

It is possible to use, as the release agent, the same wax as that used as the below-mentioned toner formulation, and examples thereof include carnauba wax, rice wax, beeswax, synthetic ester-based wax, paraffin wax, various polyolefin waxes or modified products thereof, fatty acid amide, silicone-based wax, and the like.

(Operational Advantages)

Since the above-described polyester resin for toner of the present invention includes 5 to 30% by mass of a constitutional unit derived from isosorbide, the obtained toner exhibits satisfactory storage stability and image stability. Since the polyester resin for toner of the present invention has a storage elastic modulus G' at 180° C. within a range of 400 to 1,000 Pa, the obtained toner exhibits satisfactory hot offset resistance and low temperature-fixing property. Particularly, when the polyester resin for toner includes 30% by mass or more of a constitutional unit derived from biomass, environmental burdens are reduced.

Therefore, according to the polyester resin for toner of the present invention, it is possible to obtain a toner which is excellent in storage stability, fixing property, hot offset resistance, and image stability when isosorbide is used.

According to the method for producing a polyester resin for toner of the present invention, it is possible to produce a polyester resin for toner, capable of obtaining a toner which is excellent in storage stability, fixing property, hot offset resistance, and image stability when isosorbide is used.

<Toner>

The toner of the present invention contains the above-mentioned polyester resin for toner of the present invention.

The content of the polyester resin for toner is preferably within a range of 40 to 97% by mass in 100% by mass of the toner.

The toner usually contains known coloring agents, charge control agents, release agents, and the like.

Examples of the coloring agent include carbon black, nigrosine, aniline blue, phthalocyanine blue, phthalocyanine green, Hansa yellow, rhodamine-based dyes and pigments, chromium yellow, quinacridone, benzidine yellow, rose bengal, triallylmethane-based dyes, monoazo-based, disazo-based, condensed azo-based dyes and pigments.

There is no particular limitation on the content of the coloring agent, and the content is preferably within a range of 2 to 10% by mass in 100% by mass of the toner in view of the fact that the color tone, image density, and thermal characteristics of the toner are improved.

Examples of the charge control agent include positive charge-type charge control agents such as a quaternary ammonium salt and a basic or electron-donating organic substance; and negative charge-type charge control agents such as metal chelates, a metal-containing dye, and an acidic or electron-withdrawing organic substance.

When using the toner as a color toner, taking an influence of the toner on color tone into consideration, the charge control agent is preferably colorless or pale color, and suitably a metal salt, a metal complex, an amide compound, a phenol compound, or a naphthol compound of chromium, zinc, or aluminum of salicylic acid or alkylsalicylic acid.

Furthermore, a styrene-based, an acrylic acid-based, a methacrylic acid-based, or a sulfonic acid group-containing vinyl polymer may be used as the charge control agent.

The content of the charge control agent is preferably within a range of 0.5 to 5% by mass in 100% by mass of the toner. When the content of the charge control agent is 0.5% by mass or more, the charge amount of the toner may become a sufficient level. Meanwhile, when the content is 5% by mass or less, a decrease in charge amount due to aggregation of the charge control agent may be suppressed.

Taking mold releasability, storage stability, fixing property, color developing property, and the like of the toner into consideration, it is possible to use, as the release agent, carnauba wax, rice wax, beeswax, polypropylene-based wax, polyethylene-based wax, synthetic ester-based wax, paraffin wax, fatty acid amide, silicone-based wax, and the like after being appropriately selected.

There is no particular limitation on the content of the release agent, and the content is preferably within a range of 0.3 to 15% by mass in 100% by mass of the toner.

The toner may be optionally contain additives, for example, fluidity improvers (fluidity modifiers) such as fine powdered silica, alumina, and titania; inorganic fine powders such as magnetite, ferrite, cerium oxide, strontium titanate, and conductive titania; resistance regulators such as a styrene resin and an acrylic resin; and lubricants.

The contents of these additives are preferably 0.05 to 10% by mass in 100% by mass of the toner.

The toner may contain a binder resin other than the polyester resin for toner of the present invention (other binder resin).

Examples of the other binder resin include polyester resins other than the polyester resin for toner of the present invention, styrene-based resins, styrene-acrylic resins, cyclic olefin resins, methacrylic acid-based resins, epoxy resins, and the like, and two or more thereof can be used as a mixture.

When using the toner as a magnetic one-component developer, the toner preferably contains a magnetic material.

Examples of the magnetic material include metals exhibiting magnetism, such as iron, copper, nickel, and cobalt, or alloys thereof, or compounds containing these elements.

When the magnetic material is included in the toner, the toner undergoes coloration due to the magnetic material, and thus the above-mentioned coloring agent may not be included in the toner.

(Method for Producing Toner)

A toner can be produced by a known method. Examples of the method for producing a toner include a grinding method, a chemical method, and the like.

When the toner is produced by the grinding method, first, a polyester resin for toner of the present invention, a coloring agent, a charge control agent, a release agent and, if necessary, additives, magnetic materials, and other binder resins are mixed. Then, the obtained mixture is melt-kneaded by a twin extruder or the like and subjected to coarse grinding, fine grinding, and classification, and optionally subjected to an external addition treatment of inorganic particles to obtain a toner.

Meanwhile, when the toner is produced by the chemical method, the toner is obtained by a method in which a polyester resin for toner of the present invention, a coloring agent, a charge control agent, a release agent and, if necessary, additives, magnetic materials, and other binder resins are dissolved and dispersed in a solvent, followed by granulation in an aqueous medium, removal of the solvent, washing and further drying; or a method in which an emulsion is prepared by a well-known method using a polyester resin for toner of the present invention, and the emulsion is mixed with an aqueous micro-dispersion of separately prepared formulations such as a coloring agent, a charge control agent, and a release agent, followed by aggregation to the desired particle size, combining of particles, washing and further drying.
(Operational Advantages)

The toner of the present invention described above is excellent in storage stability, fixing property, hot offset resistance, and image stability when isosorbide is used since it contains the polyester resin for toner of the present invention.
(Uses)

The toner of the present invention can be used as it is as a one-component developer. The toner can be used as a magnetic one-component developer if it contains a magnetic material, and the toner can be used as a non-magnetic one-component developer if it contains no magnetic material.

It is also possible to use the toner as a non-magnetic two-component developer if the toner containing no magnetic material is used in combination with a carrier. Examples of the carrier include metals exhibiting magnetism, such as iron, copper, nickel, and cobalt, or alloys thereof, or compounds containing these elements.

EXAMPLES

The present invention will be described in more detail below by way of Examples and Comparative Examples, but the present invention is not limited thereto.

Various measurements and evaluations were performed by the following procedures.
(1) Method for Measurement of Physical Properties of Polyester Resin for Toner
(Glass Transition Temperature (Tg))

Using a differential scanning calorimeter DSC-60 manufactured by Shimadzu Corporation, melt quenching was performed by heating at 100° C. for 10 minutes, and then the measurement was performed at a temperature raising rate of 5° C./minute. The temperature at the intersection between the chart baseline at the low temperature side and the tangent to the endothermic curve near Tg was determined and regarded as Tg of a polyester resin for toner.
(Softening Temperature (T4))

Using a flow tester CFT-500 manufactured by Shimadzu Corporation, the measurement was performed by a nozzle measuring 1 mm$\phi$×10 mm under the constant rate heating conditions of a load of 294 N (30 Kgf) and a temperature raising rate of 3° C./minute. The softening temperature was determined as the temperature at which ½ of 1.0 g of a sample exhibited flow, and this temperature was regarded as T4 of a polyester resin for toner.
(Acid Value (AV))

After accurately weighing about 0.2 g of a sample in a side-arm Erlenmeyer flask (A (g)), 10 ml of benzyl alcohol was added and the mixture was heated for 15 minutes using a heater at 230° C. under a nitrogen atmosphere to dissolve the resin. After allowing to cool to room temperature, 10 ml of benzyl alcohol, 20 ml of chloroform, and a few drops of phenolphthalein were added, and then titration was performed with a 0.02 N KOH benzyl alcohol solution (titer=B (ml), KOH solution strength=p). Blank measurement was carried out in the same manner (titer=C (ml)), and AV of a polyester resin for toner was calculated according to the following formula.

$$AV(mgKOH/g)=\{(B-C)\times 0.02\times 56.11\times p\}/A$$

(Storage Elastic Modulus G')

Using AR-2000ex manufactured by TA Instruments, a sample was set between 25 mm$\phi$ parallel plates with a thickness of 1 mm, and then the measurement was performed within a range from 100° C. to 200° C. under the conditions of a frequency of 1 Hz, a strain of 1%, and a temperature raising rate of 3° C./minute to determine each storage elastic modulus G' at 120° C. and 180° C.
(2) Method for Evaluation of Performances of Toner
(Storage Stability)

After weighing about 5 g of a toner, the toner was charged in a sample bottle and then allowed to stand for about 24 hours in a drier warmed at 50° C. Thereafter, the degree of toner aggregation was evaluated as an indicator of storage stability (blocking resistance). Evaluation criteria are as follows.

A (excellent): Toner is dispersed only by inverting the sample bottle.

B (good): Toner is dispersed after inverting the sample bottle and tapping it 1 to 3 times C (available): Toner is dispersed after inverting the sample bottle and tapping it 4 to 5 times.

D (poor): Toner is not dispersed after inverting the sample bottle and tapping it at least 5 times.
(Low Temperature-Fixing Property)

A printer equipped with a fixing roller not coated with silicone oil, set at a roller speed of 100 mm/sec, and capable of changing a roller temperature was used. A solid image measuring 4.5 cm×15 cm was made as a test pattern at a toner density of 0.5 mg/cm$^2$, and then fixed by setting the temperature of the fixing roller at 145° C. Using an image densitometer manufactured by GretagMacbeth Corporation, the image density of this test pattern image was measured and recorded.

After inwardly folding the portion where the concentration is to be measured, lengthwise, 1 kg of a weight was slid 5 times at the folding portion over a protective paper put thereon to give a fold. Subsequently, after outwardly folding at the same fold, 1 kg of a weight was slid 5 times at the folding portion over a protective paper put thereon. The test paper was smoothed out and a cellophane tape (No. 29, manufactured by NITTO DENKO CS SYSTEM CORPORATION) was stuck to the folding portion. After tracing 5 times, the cellophane tape was slowly peeled and the image density of the folding portion was measured by an image densitometer manufactured by GretagMacbeth Corporation. The same measurement was performed at 3 positions and each fixing ratio was calculated by the image density before and after test, and then the evaluation was performed based on an average fixing ratio of 3 positions according to the following criteria.

Fixing ratio(%)=(image density after test/image density before test)×100

A (excellent): The fixing ratio is 85% or more.

B (good): The fixing ratio is 75% or more and less than 85%.

C (poor): The fixing ratio is less than 75%, or offset phenomenon occurred at 145° C., thus making it impossible to measure the image density.
(Hot Offset Resistance)

A printer equipped with a fixing roller not coated with silicone oil, set at a roller speed of 30 mm/sec, and capable of changing a roller temperature was used. A solid image measuring 4.5 cm×15 cm was printed as a test pattern at a toner density of 0.5 mg/cm$^2$ every roller temperature of 5° C. The lowest temperature at which a toner migrates to the fixing roller due to a hot offset phenomenon upon fixing was decided as a hot offset occurring temperature, and then hot offset resistance was evaluated according to the following criteria.

A (excellent): No hot offset occurs at 200° C.

B (good): The hot offset occurring temperature is higher than 185° C. and 200° C. or lower.

C (poor): The hot offset occurring temperature is 185° C. or lower.

(Image Stability)

Under the environment at 25° C. and 60 RH %, the image stability was evaluated by visually observing a change in image between the 1st sheet and the 3,000th sheet after printing 3,000 sheets with a test pattern under the same conditions as for evaluation of the low temperature-fixing property.

A (good): The image density does not change, or less influence is exerted.

B (limit of availability): The image density changes, leading to limit of availability attained by improving with additives.

C (poor): The image density significantly changes.

Example 1

<Production of Polyester Resin for Toner>

Each charge amount shown in Table 1 of polyhydric carboxylic acid and polyhydric alcohol, and 500 ppm (based on the total charge amount of the whole acid component) of tetrabutyl titanate were charged in a reaction vessel equipped with a distillation column.

In Table 1 and the below-mentioned Table 2, the charge amount (parts by mol) of each component based on 100 parts by mol of the total charge amount of the whole acid component, and the charge amount (% by mass) of each component in 100% by mass of the total charge amount of polyhydric carboxylic acid and polyhydric alcohol were shown.

Terephthalic acid, isophthalic acid, adipic acid, and trimellitic anhydride in Tables 1 and 2 correspond to the polyhydric carboxylic acid, while diol A, 1,3-propanediol, and isosorbide correspond to the polyhydric alcohol.

While maintaining the rotational speed of a stirring blade in the reaction vessel at 120 rpm, temperature rising was initiated and heating was performed so that the temperature in the reaction system becomes 265° C., followed by maintaining this temperature. After completion of the esterification reaction, leading to cessation of run-off of water from the reaction system, the temperature in the reaction system was reduced and maintained at 225° C., the pressure inside the reaction vessel was reduced to 133 Pa over about 40 minutes, and then the polycondensation reaction was performed while distilling off the diol component from the reaction system.

The viscosity of the reaction system increased as the reaction proceeded, and nitrogen was introduced into the reaction system as the viscosity increased to increase the vacuum degree, and then the polycondensation reaction was carried out until the stirring blade torque reached a value indicating the desired softening temperature. Upon reaching the prescribed torque, stirring was stopped. The polycondensation reaction time from the beginning of pressure reduction to stopping of stirring was 104 minutes. Immediately after stopping of stirring, the pressure of the reaction system was returned to normal pressure by introducing nitrogen. After pressurizing by nitrogen, the reaction product was removed and cooled to 100° C. or lower to obtain a polyester resin for toner. The polycondensation reaction temperature, the polycondensation reaction time, and the softening temperature upon completion of the polycondensation reaction are shown in Table 1.

The measurement results of physical properties of the obtained polyester resin for toner are shown in Table 1.

<Production of Toner>

Using the obtained polyester resin for toner, conversion into a toner was performed. First, 93 parts by mass of the polyester resin for toner, 3 parts by mass of a quinacridone pigment (HOSTAPARM PINK E, C.I. No.: Pigment Red 122, manufactured by Clariant Corporation), 3 parts by mass of a carnauba wax No. 1 (manufactured by TOYO ADL CORPORATION), and 1 part by mass of a negative charge type charge control agent (LR-147, manufactured by Japan Carlit Co., Ltd.) were mixed by a Henschel mixer for 5 minutes.

Then, the obtained mixture was melt-kneaded by a twin-screw kneader. Melt-kneading was performed by setting the inner temperature at the softening temperature of the resin. After kneading and cooling, a toner mass was obtained and the toner mass was finely ground into fine particles having a diameter of 10 μm or less by a jet-mill fine grinder, and then the particle size was sorted by removing fine particles having a diameter of 3 μm or less using a classifier. To 100 parts by mass of the obtained fine powder, 0.25 part by mass of silica (R-972, manufactured by NIPPON AEROSIL CO., LTD.) was added, followed by blending using a Henschel mixer to obtain a toner.

The evaluation results of performances of the obtained toner are shown in Table 1.

Examples 2 to 7 and Comparative Examples 1 to 5

In the same manner as in Example 1, except that the charge amounts of polyhydric carboxylic acid and polyhydric alcohol, and polycondensation conditions were changed as shown in Tables 1 and 2, polyester resins for toner were obtained. The measurement results of physical properties of the obtained polyester resins for toner are shown in Tables 1 and 2.

Using the obtained polyester resins for toner, toners were obtained in the same manner as in Example 1. The evaluation results of performances of the obtained toners are shown in Tables 1 and 2.

|  |  | Example 1 | | Example 2 | | Example 3 | | Example 4 | | Example 5 | | Example 6 | | Example 7 | |
|---|---|---|---|---|---|---|---|---|---|---|---|---|---|---|---|
|  |  | Parts by mol | Mass % | Parts by mol | Mass % | Parts by mol | Mass % | Parts by mol | Mass % | Parts by mol | Mass % | Parts by mol | Mass % | Parts by mol | Mass % |
| Charge amount | Terephthalic acid | 90.0 | 51.6 | 90.0 | 48.7 | 60.0 | 32.7 | 90.0 | 51.5 | 75.0 | 40.3 | 60.0 | 32.7 | 60.0 | 32.7 |
|  | Isophthalic acid |  |  |  |  | 25.0 | 13.6 |  |  |  |  | 25.0 | 13.6 | 25.0 | 13.6 |
|  | Adpic acid |  |  |  |  |  |  |  |  | 10.0 | 4.7 |  |  |  |  |
|  | Trimellitic anhydride | 10.0 | 6.6 | 10.0 | 6.3 | 15.0 | 9.4 | 10.0 | 6.6 | 15.0 | 9.3 | 15.0 | 9.4 | 15.0 | 9.4 |
|  | Diol A | 6.0 | 7.6 | 8.0 | 9.4 | 3.0 | 3.6 | 8.0 | 10.0 |  |  | 3.0 | 3.6 | 3.0 | 3.6 |
|  | 1,3-Propanediol (Derived from plant) | 86.0 | 22.6 | 78.0 | 19.4 | 77.0 | 19.2 | 91.0 | 23.9 | 70.0 | 17.2 | 77.0 | 18.2 | 77.0 | 19.2 |
|  | Isosorbide (Derived from plant) | 23.0 | 11.6 | 34.0 | 16.2 | 45.0 | 21.5 | 16.0 | 8.0 | 60.0 | 28.4 | 45.0 | 21.5 | 45.0 | 21.5 |

|  |  | Example 1 | | Example 2 | | Example 3 | | Example 4 | | Example 5 | | Example 6 | | Example 7 | |
|---|---|---|---|---|---|---|---|---|---|---|---|---|---|---|---|
|  |  | Parts by mol | Mass % | Parts by mol | Mass % | Parts by mol | Mass % | Parts by mol | Mass % | Parts by mol | Mass % | Parts by mol | Mass % | Parts by mol | Mass % |
| Amount of isosorbide (Mass %) | | 11.6 | | 16.2 | | 21.5 | | 8.0 | | 28.4 | | 21.5 | | 21.5 | |
| Amount of whole plant-derived raw materials (Mass %) | | 34.2 | | 35.6 | | 40.7 | | 31.9 | | 45.6 | | 40.7 | | 40.7 | |
| Poly-condensation conditions | Polycondensation reaction temperature (° C.) | 225.0 | | 225.0 | | 225.0 | | 225.0 | | 225.0 | | 210.0 | | 230.0 | |
| | Polycondensation reaction time (Minutes) | 104.0 | | 104.0 | | 108.0 | | 113.0 | | 93.0 | | 230.0 | | 72.0 | |
| | Softening temperature upon completion (° C.) | 136.0 | | 141.0 | | 147.0 | | 138.0 | | 143.0 | | 140.0 | | 148.0 | |
| Resin properties | Tg (° C.) | 56.2 | | 63.0 | | 60.8 | | 51.2 | | 59.4 | | 58.9 | | 60.5 | |
| | AV (mgKOH/g) | 13.9 | | 7.1 | | 11.0 | | 12.8 | | 11.2 | | 13.3 | | 11.0 | |
| | G' (Pa)@120° C. | 13500 | | 18000 | | 18000 | | 13700 | | 14300 | | 15500 | | 18500 | |
| | G' (Pa)@180° C. | 800 | | 530 | | 920 | | 820 | | 850 | | 700 | | 950 | |
| | T4-Tg (° C.) | 79.8 | | 78.0 | | 86.2 | | 86.8 | | 83.6 | | 81.1 | | 87.5 | |
| Toner performances | Storage stability | B | | A | | B | | C | | B | | B | | B | |
| | Low temperature-fixing property | A | | B | | B | | A | | B | | B | | B | |
| | Hot offset resistance | B | | B | | A | | A | | A | | B | | A | |
| | Image stability | B | | B | | B | | B | | C | | B | | B | |

|  |  | Comparative Example 1 | | Comparative Example 2 | | Comparative Example 3 | | Comparative Example 4 | | Comparative Example 5 | |
|---|---|---|---|---|---|---|---|---|---|---|---|
|  |  | Parts by mol | Mass % | Parts by mol | Mass % | Parts by mol | Mass % | Parts by mol | Mass % | Parts by mol | Mass % |
| Charge amount | Terephthalic acid | 90.0 | 52.0 | 65.0 | 33.8 | 60.0 | 32.7 | 60.0 | 32.7 | 85 | 51.5 |
| | Isophthalic acid | | | | | 25.0 | 13.6 | 25.0 | 13.8 | 15 | 9.1 |
| | Adipic acid | | | 20.0 | 9.1 | | | | | | |
| | Trimellitic anhydride | 10.0 | 6.7 | 15.0 | 9.0 | 15.0 | 9.4 | 15.0 | 9.4 | | |
| | Diol A | 9.0 | 11.3 | | | 3.0 | 3.6 | 3.0 | 3.6 | 5 | 6.6 |
| | 1,3-Propanediol (Derived from plant) | 98.0 | 25.9 | 52.0 | 12.4 | 77.0 | 19.2 | 77.0 | 19.2 | 80 | 22.2 |
| | Isosorbide (Derived from plant) | 8.0 | 4.1 | 78.0 | 35.7 | 45.0 | 21.5 | 45.0 | 21.5 | 20 | 10.7 |
| Amount of isosorbide (Mass %) | | | 4.1 | | 35.7 | | 21.5 | | 21.5 | | 10.7 |
| Amount of whole plant-derived raw materials (Mass %) | | | 30.0 | | 48.1 | | 40.7 | | 40.7 | | 32.9 |
| Poly-condensation conditions | Polycondensation reaction temperature (° C.) | | 225.0 | | 225.0 | | 225.0 | | 225.0 | | 225.0 |
| | Polycondensation reaction time (Minutes) | | 105.0 | | 91.0 | | 99.0 | | 112.0 | | 222 |
| | Softening temperature upon completion (° C.) | | 135.0 | | 144.0 | | 130.0 | | 155.0 | | 137 |
| Resin properties | Tg (° C.) | | 45.2 | | 59.0 | | 58.0 | | 64.2 | | 63.5 |
| | AV (mgKOH/g) | | 10.6 | | 12.0 | | 16.5 | | 9.8 | | 9 |
| | G' (Pa)@120° C. | | 128000 | | 15000 | | 8000 | | 32000 | | 8000 |
| | G' (Pa)@180° C. | | 850 | | 1000 | | 310 | | 1100 | | 20 |
| | T4-Tg (° C.) | | 89.8 | | 85.0 | | 72.0 | | 90.8 | | 73.5 |
| Toner performances | Storage stability | | D | | B | | B | | A | | A |
| | Low temperature-fixing property | | A | | B | | A | | D | | B |
| | Hot offset resistance | | A | | A | | D | | A | | D |
| | Image stability | | B | | D | | B | | B | | B |

As diol A, 1,3-propanediol, and isosorbide in Tables 1 and 2, the followings were used.

Diol A: Polyoxypropylene-(2.3)-2,2-bis(4-hydroxyphenyl)propane 1,3-Propanediol: 1,3-Propanediol derived from biomass (derived from plant) (Susterra (registered trademark) propanediol (manufactured by DuPont Company))

Isosorbide: Isosorbide derived from biomass (derived from plant) (Polysorb-PB (registered trademark) (manufactured by Roquette, Inc.))

"G' (Pa)@120° C." in Tables 1 and 2 means a storage elastic modulus G' at 120° C. of a polyester resin for toner, and "G' (Pa)@180° C." means a storage elastic modulus G' at 180° C. of a polyester resin for toner.

As is apparent from Table 1, environmental burdens were reduced in the polyester resins for toner obtained in the respective Examples. Toners containing these polyester resins for toner were excellent in storage stability, fixing property, hot offset resistance, and image stability.

Meanwhile, as is apparent from Table 2, in Comparative Example 1, the toner exhibited insufficient storage stability because of small content of a constitutional unit derived from isosorbide.

In Comparative Example 2, the toner exhibited insufficient image stability because of large content of a constitutional unit derived from isosorbide.

In Comparative Example 3, the toner exhibited poor hot offset resistance because of low softening temperature upon completion of the polycondensation and low storage elastic modulus G' at 180° C.

In Comparative Example 4, the toner exhibited low temperature-fixing property because of high softening temperature upon completion of the polycondensation and high storage elastic modulus G' at 180° C.

In Comparative Example 5, the toner exhibited poor hot offset resistance because of low storage elastic modulus G' at 180° C.

Industrial Applicability

According to the polyester resin for toner of the present invention, it is possible to obtain a toner which is excellent in storage stability, fixing property, hot offset resistance, and image stability when isosorbide is used.

According to the method for producing a polyester resin for toner of the present invention, it is possible to produce a polyester resin for toner, capable of obtaining a toner which is excellent in storage stability, fixing property, hot offset resistance, and image stability when isosorbide is used.

The toner of the present invention is excellent in storage stability, fixing property, hot offset resistance, and image stability when isosorbide is used.

The invention claimed is:

1. A polyester resin, comprising 5 to 30% by mass of a constitutional unit derived from isosorbide, wherein
a storage elastic modulus G' at 180° C. of said polyester resin is 400 to 1,000 Pa; and
a Tg of said polyester resin is 50 to 65° C.

2. The polyester resin according to claim 1, further comprising a constitutional unit derived from a tri- or higher polyhydric carboxylic acid.

3. The polyester resin according to claim 2, comprising 5 to 25 parts by mol of the constitutional unit derived from a tri- or higher polyhydric carboxylic acid based on a total content of acid component in the polyester resin of 100 parts by mol.

4. The polyester resin according to claim 1, comprising 30% by mass or more of a constitutional unit derived from biomass.

5. The polyester resin according to claim 1, comprising 9 to 25% by mass of the constitutional unit derived from isosorbide.

6. The polyester resin according to claim 1, further comprising a constitutional unit derived from 1,3-propanediol.

7. The polyester resin according to claim 6, wherein the 1,3-propanediol is derived from biomass.

8. A method for producing a polyester resin, comprising polycondensing a mixture comprising 5 to 30% by mass of isosorbide and a polyhydric carboxylic acid at 230° C. or lower, and completing a polycondensation reaction at a softening temperature within a range of 135 to 150° C.,
wherein the polyester resin produced has a storage elastic modulus G' at 180° C. of 400 to 1,000 Pa and a Tg of 50 to 65° C.

9. The method for producing a polyester resin according to claim 8, wherein the polyhydric carboxylic acid comprises a tri- or higher polyhydric carboxylic acid.

10. The method for producing a polyester resin according to claim 9, wherein the mixture comprises 5 to 25 parts by mol of the tri- or higher polyhydric carboxylic acid based on a total content of acid component in the mixture of 100 parts by mol.

11. The method for producing a polyester resin according to claim 8, wherein the mixture comprises 30% by mass or more of a raw material derived from biomass.

12. The method for producing a polyester resin according to claim 8, which comprises 9 to 25% by mass of the isosorbide in the mixture.

13. The method for producing a polyester resin according to claim 8, wherein the mixture comprises 1,3-propanediol.

14. The method for producing a polyester resin according to claim 8, wherein the mixture is polycondensed at 215° C. or higher.

15. A toner comprising the polyester resin according to claim 1.

16. The polyester resin according to claim 3, further comprising a constitutional unit derived from 1,3-propanediol.

17. The method according to claim 16, further comprising a constitutional unit derived from at least one of terephthalic acid and isophthalic acid.

18. A polyester resin, comprising 5 to 30% by mass of a constitutional unit derived from isosorbide and 5 to 25 parts by mol of a constitutional unit derived from a tri- or higher polyhydric carboxylic acid based on a total content of acid component in the polyester resin of 100 parts by mol, wherein a storage elastic modulus G' at 180° C. of said polyester resin is 400 to 1,000 Pa.

19. A method for producing the polyester resin of claim 18, comprising polycondensing a mixture comprising 5 to 30% by mass of isosorbide and 5 to 25 parts by mol of a constitutional unit derived from a tri- or higher polyhydric carboxylic acid based on a total content of acid component in the polyester resin of 100 parts by mol, at 230° C. or lower, and completing a polycondensation reaction at a softening temperature within a range of 135 to 150° C.

20. A toner comprising the polyester resin according to claim 18.

* * * * *